(12) United States Patent
Abe et al.

(10) Patent No.: US 11,177,675 B2
(45) Date of Patent: Nov. 16, 2021

(54) CHARGING CONTROL DEVICE

(71) Applicant: HONDA MOTOR CO., LTD., Tokyo (JP)

(72) Inventors: Hajime Abe, Wako (JP); Naoya Okada, Wako (JP); Hiroki Tsutsumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 16/417,758

(22) Filed: May 21, 2019

(65) Prior Publication Data
US 2019/0363546 A1    Nov. 28, 2019

(30) Foreign Application Priority Data

May 22, 2018   (JP) ............................. JP2018-097566

(51) Int. Cl.
*H02J 7/00*   (2006.01)
*H01M 10/44*   (2006.01)

(52) U.S. Cl.
CPC ............ *H02J 7/007* (2013.01); *H01M 10/44* (2013.01); *H02J 7/0048* (2020.01); *H02J 7/00714* (2020.01); *H02J 7/007194* (2020.01); *H01M 2220/20* (2013.01)

(58) Field of Classification Search
CPC .... H02J 7/007; H02J 7/00712; H02J 7/00714; H02J 7/0048; H01M 10/44; H01M 10/443

USPC .................. 320/132, 134, 150, 152, 160
See application file for complete search history.

(56) References Cited

U.S. PATENT DOCUMENTS

| 2016/0181832 A1* | 6/2016 | Hatano | H02J 7/0086 320/162 |
| 2019/0084435 A1* | 3/2019 | Grace | H01M 10/443 |

FOREIGN PATENT DOCUMENTS

| JP | 2015-023684 A | 2/2015 |
| JP | 2015-082948 A | 4/2015 |

OTHER PUBLICATIONS

Office Action dated Dec. 3, 2019 issued over the corresponding Japanese Patent Application No. 2018-097566 with the English translation thereof.

* cited by examiner

*Primary Examiner* — Edward Tso
*Assistant Examiner* — Aaron Piggush
(74) *Attorney, Agent, or Firm* — Carrier Blackman & Associates, P.C.; Joseph P. Carrier; Jeffrey T. Gedeon (57) ABSTRACT

A charging control device is equipped with a state of charge detection unit adapted to detect a state of charge of a secondary battery, a storage unit adapted to store a charging pattern in which the state of charge and a charging current are associated, and a charging control unit adapted to change the charging pattern in accordance with the state of charge of the secondary battery when charging is initiated, and to control the charging current in accordance with the charging pattern after having been changed.

10 Claims, 8 Drawing Sheets

CHARGING PATTERN CP1 IN WHICH SOC WHEN CHARGING IS INITIATED IS 30% IS SHIFTED SO THAT THE SOC WHEN CHARGING IS INITIATED BECOMES SOC OF 20%

BEFORE SHIFTING

AFTER SHIFTING

METHOD OF SHIFTING CHARGING PATTERN CP1

FIG. 5

CHARGING PATTERN CP1 IN WHICH SOC WHEN CHARGING IS INITIATED IS 30% IS SHIFTED SO THAT THE SOC WHEN CHARGING IS INITIATED BECOMES SOC OF 20%

BEFORE SHIFTING

AFTER SHIFTING

CHARGING CONTROL DEVICE

CROSS-REFERENCE TO RELATED APPLICATION

This application is based upon and claims the benefit of priority from Japanese Patent Application No. 2018-097566 filed on May 22, 2018, the contents of which are incorporated herein by reference.

BACKGROUND OF THE INVENTION

Field of the Invention

The present invention relates to a charging control device adapted to control a charging current supplied to a secondary battery.

Description of the Related Art

Japanese Laid-Open Patent Publication No. 2015-023684 discloses a technique for controlling a charging current in accordance with a charging pattern that causes the charging current to decrease as it approaches full charge when charging a secondary battery.

SUMMARY OF THE INVENTION

However, in Japanese Laid-Open Patent Publication No. 2015-023684, there is a concern that the charging time may become prolonged, or that electrolytic deposition cannot be suppressed, depending on the state of charge of the secondary battery when charging is initiated.

An aspect of the present invention relates to a charging control device adapted to control a charging current supplied to a secondary battery, the charging control device comprising a state of charge detection unit adapted to detect a state of charge of the secondary battery, a storage unit adapted to store a charging pattern in which the state of charge and the charging current are associated in a manner so that the charging current decreases as the state of charge approaches full charge, and a charging control unit adapted to change the charging pattern in accordance with the state of charge of the secondary battery when charging is initiated, and to control the charging current in accordance with the charging pattern after having been changed.

According to such an aspect of the present invention, regardless of the state of charge of the secondary battery when charging is initiated, it is possible to suppress an increase in the charging time, and to suppress the occurrence of electrolytic deposition.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a charging control device according to the present invention will be presented and described in detail below with reference to the accompanying drawings.

Embodiment

Figure 1:
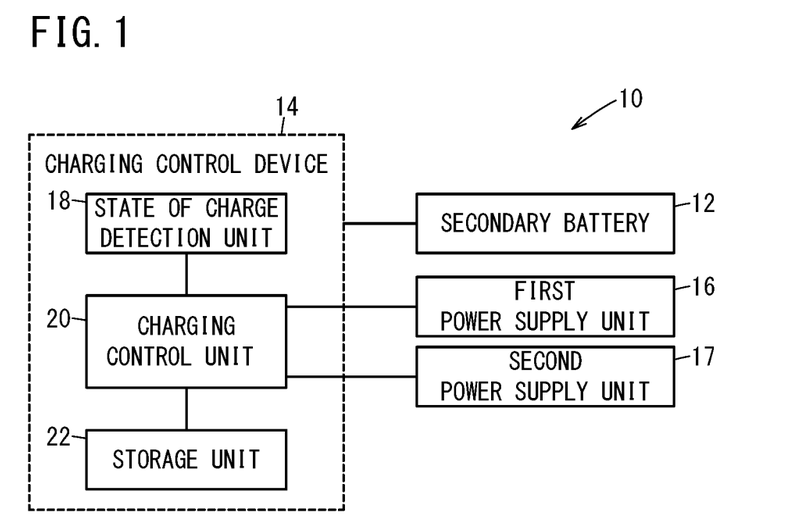
FIG. 1 is a block diagram showing the functions of a secondary battery charging system equipped with a charging control device according to an embodiment of the present invention.

FIG. 1 is a block diagram showing the functions of a secondary battery charging system 10 according to an embodiment of the present invention.

As shown in FIG. 1, the secondary battery charging system 10 is equipped with a secondary battery 12, a charging control device 14, a first power supply unit 16, and a second power supply unit 17. A charging device for the secondary battery 12 is constituted by the charging control device 14, the first power supply unit 16, and the second power supply unit 17. The secondary battery charging system 10 is a system that performs rapid charging or normal charging of the secondary battery 12. The first power supply unit 16 is a high voltage commercial power supply which is used at a time of rapid charging. The second power supply unit 17 is a low voltage household power supply which is used at a time of normal charging.

For example, a lithium ion battery is used as the secondary battery 12. As applications for the secondary battery 12, for example, in addition to mobile devices such as personal computers, mobile phones, and the like, mobile vehicles such as electric vehicles, plug-in hybrid cars, electrically assisted bicycles, forklifts, and the like, there may also be cited AEDs (automatic external defibrillators), road studs, and the like. According to the present embodiment, the secondary battery 12 and the charging control device 14 are provided in an electric vehicle or a plug-in hybrid car.

When connected to the first power supply unit 16 which is a commercial power supply (in the rapid charging mode), the charging control device 14 charges the secondary battery 12 at a high speed (in a short time period) with a relatively large charging current. Further, when connected to the second power supply unit 17 which is a household power supply (in the normal charging mode), the charging control device 14 charges the secondary battery 12 at a low speed (over a long time period) with a relatively small charging current.

The charging control device 14 includes a state of charge detection unit 18, a charging control unit 20, and a storage unit 22.

The state of charge detection unit 18 detects a charge percentage, i.e., a state of charge (SOC), of the secondary battery 12 on the basis of the voltage, the charging current, and the discharge current, etc., of the secondary battery 12, and sends the detection result thereof to the charging control unit 20. At a time of full charge, the SOC is 100%, and at a time of full discharge, the SOC is 0%. Hereinafter, the state of charge of the secondary battery 12 will be simply referred to as "SOC".

The storage unit 22 is realized, for example, by a memory such as a ROM, a RAM, a flash memory, or the like, or a hard disk, and data of at least one charging pattern CP (see FIG. 3) for the secondary battery 12 is stored in a storage area of the storage unit 22. As can be understood from FIG. 3, the charging pattern CP is used to control the charging current supplied to the secondary battery 12, and is a pattern, also referred to as a "charge profile", in which the state of charge of the secondary battery 12 is associated with the charging current.

The charging control unit 20 is connected to the first power supply unit 16 or the second power supply unit 17, receives a supply of current from the connected power supply unit, adjusts the current, and after adjustment thereof, supplies the adjusted current as a charging current to the secondary battery 12. In greater detail, on the basis of the detection result of the state of charge detection unit 18 and the charging mode, the charging control unit 20, as necessary, uses the at least one charging pattern CP that is stored in the storage unit 22, and by adjusting the current from the power supply unit, controls the charging current that is supplied to the secondary battery 12. The charging control unit 20 includes an inverter or the like that converts an alternating current into a direct current, and controls the charging current using the inverter or the like.

Further, the charging control unit 20 includes a mode determining function that determines whether the charging mode is the rapid charging mode or the normal charging mode. More specifically, the charging control unit 20 determines that the charging mode is in the rapid charging mode when it is connected to the first power supply unit 16, and determines that the charging mode is in the normal charging mode when it is connected to the second power supply unit 17.

The state of charge detection unit 18 and the charging control unit 20 are realized, for example, by a CPU (Central Processing Unit), an FPGA (Field Programmable Gate Array), or the like.

At first, a description will be given concerning a case in which the secondary battery 12 is rapidly charged by the secondary battery charging system 10.

Incidentally, it is known that when a lithium ion battery is charged particularly at a high voltage and with a high current, Li electrolytic deposition (precipitation of Li metal on the negative electrode surface in the lithium ion battery) tends to easily occur as the SOC becomes higher. Because it is a cause of deterioration in performance and thermal runaway of the secondary battery 12, it is necessary for such Li electrolytic deposition to be suppressed. Stated otherwise, it is necessary to reduce the charging current in accordance with an increase in the SOC. On the other hand, there is a concern that the charging time will be prolonged if the charging current is lowered excessively with respect to the SOC value.

Figure 2A:
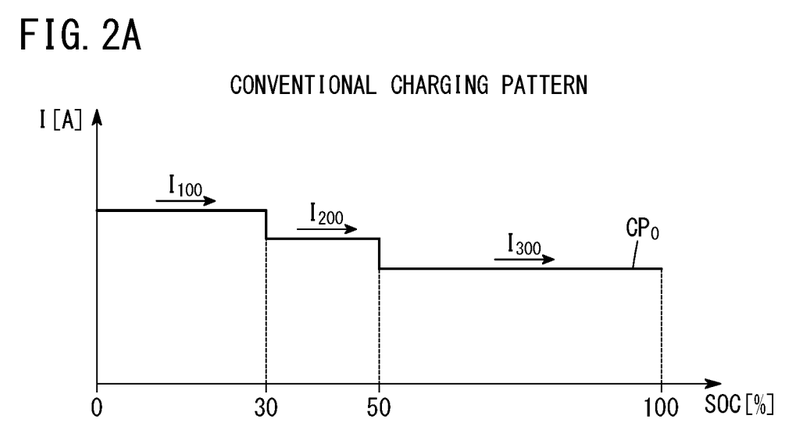
FIG. 2A is a diagram showing a conventional charging pattern.

Thus, according to a conventional technique, for example, as shown in FIG. 2A, the charging current is controlled in accordance with a charging pattern in which the charging current is decreased in a stepwise manner as the SOC approaches a fully charged state. Such a charging pattern is defined by a charging pattern $CP_0$ in which the charging current becomes a constant current $I_{100}$ when the SOC is 0 to 30%, the charging current becomes a constant current $I_{200}$ when the SOC is 30 to 50%, and the charging current becomes a constant current $I_{300}$ when the SOC is 50 to 100%.

In this instance, in the case that the secondary battery 12 is charged to the same SOC (for example, 100%), then as the SOC of the secondary battery 12 when charging is initiated is lower (as the amount of power supplied to the secondary battery is greater), it becomes more likely for Li electrolytic deposition to occur. Accordingly, it is necessary to reduce the charging current as the amount of power supplied to the secondary battery 12 becomes greater. Stated otherwise, an ideal charging pattern exists for each SOC when charging is initiated.

According to the conventional technique, since the same charging pattern $CP_0$ is used regardless of the SOC of the secondary battery when charging is initiated (i.e., since the charging current for each SOC is determined regardless of the SOC when charging is initiated), while Li electrolytic deposition is suppressed, it becomes difficult to suppress a lengthening (prolongation) of the charging time.

Figure 2B:
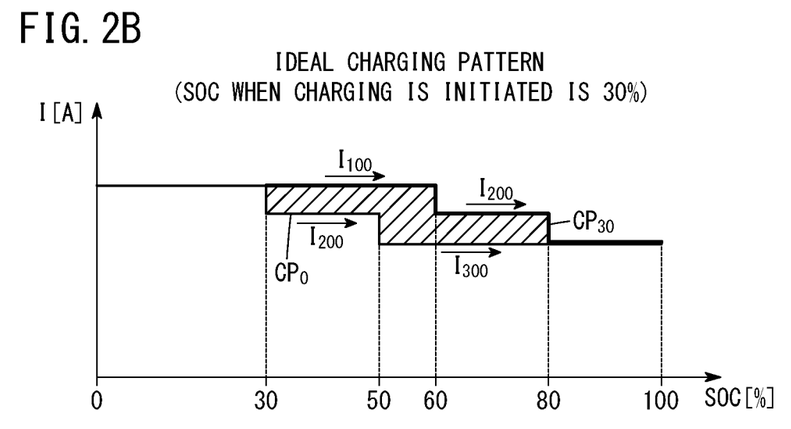
FIG. 2B is a diagram showing an ideal charging pattern.

An ideal charging pattern $CP_{30}$ (in which suppression of lengthening of the charging time and suppression of Li electrolytic deposition are balanced) when the SOC is 30% at the time that charging is initiated is shown by the thick solid line in FIG. 2B. In FIG. 2B, the charging pattern $CP_0$ is shown by the thin solid line for the purpose of comparison with the charging pattern $CP_{30}$. Such a charging pattern $CP_{30}$ is defined by a charging pattern in which the charging current becomes a constant current $I_{100}$ when the SOC is 30 to 60%, the charging current becomes a constant current $I_{200}$ when the SOC is 60 to 80%, and the charging current becomes a constant current $I_{300}$ when the SOC is 80 to 100%.

From FIG. 2B, it can be understood that, in the charging pattern $CP_0$, within the SOC range of 30 to 80%, the charging current is smaller in comparison with that of the charging pattern $CP_{30}$ (refer to the hatched portion shown in FIG. 2B). Due to this fact, it can be understood that, if the charging pattern $CP_0$ were used without modification regardless of the SOC of the secondary battery when charging is initiated, the charging time would become prolonged.

Thus, according to the present embodiment, in order that charging can be performed with the largest possible charging current, without causing Li electrolytic deposition to be generated in relation to any arbitrary SOC during charging of the secondary battery 12, the charging control unit 20 is adapted to select an appropriate charging pattern CP from among a plurality of charging patterns CP in accordance with the SOC of the secondary battery 12 when charging is initiated, and to change the selected charging pattern CP as necessary.

More specifically, the charging control unit 20 sets the plurality of charging patterns CP, sets reference states of charge when the SOC at the time that charging is initiated is 30%, 50%, and 70%, respectively, and selectively uses three charging patterns CP1, CP2, and CP3 (see FIG. 3) which decrease in a stepwise manner as the SOC approaches the fully charge state.

Figure 3:
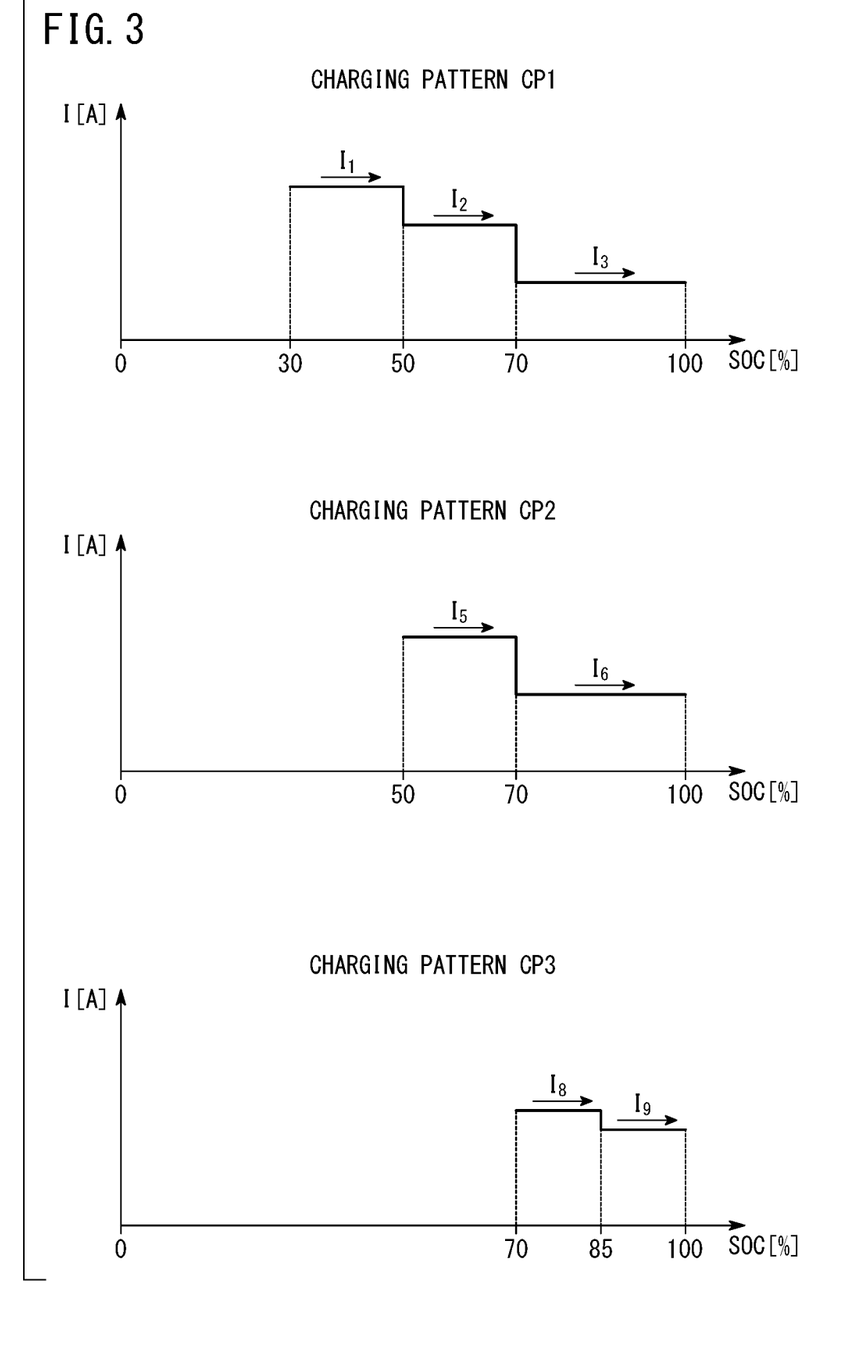
FIG. 3 is a diagram showing three charging patterns that are stored in a storage unit.

At this time, as will be described in detail below, from among the three charging patterns CP1, CP2, and CP3, the charging control unit 20 selects and uses the charging pattern CP for which the reference state of charge thereof is closest to the SOC of the secondary battery 12 when charging is initiated, and which is higher than the SOC.

In the charging pattern CP1, the charging current becomes a constant current $I_1$ when the SOC lies within a range of 30 to 50%, the charging current becomes a constant current $I_2$ ($<I_1$) when the SOC lies within a range of 50 to 70%, and the charging current becomes a constant current $I_3$ ($<I_2$) when the SOC lies within a range of 70 to 100%. The value of $I_1$ is a maximum value at which Li electrolytic deposition does not occur, or a value that is slightly lower than such a maximum value, when the SOC lies within the range of 30 to 50%. The value of $I_2$ is a maximum value at which Li electrolytic deposition does not occur, or a value that is slightly lower than such a maximum value, when the SOC lies within the range of 50 to 70%. The value of $I_3$ is a maximum value at which Li electrolytic deposition does not occur, or a value that is slightly lower than such a maximum value, when the SOC lies within the range of 70 to 100%.

In this manner, the charging pattern CP1 is a charging pattern CP corresponding to a SOC of 30 to 100%, in which the state of charge when charging is initiated is set to 30%. More specifically, the charging pattern CP1 is an ideal (optimum) charging pattern CP when the SOC of the secondary battery 12 at the time that charging is initiated is 30%.

In this instance, because the charging pattern CP1 is a charging pattern CP in which Li electrolytic deposition does not occur when the SOC of the secondary battery 12 at the time that charging is initiated is 30%, Li electrolytic deposition is not generated, even if the charging control unit 20 causes the charging pattern CP1 to be shifted to a side where the SOC becomes lower, and controls the charging current in accordance with the charging pattern CP1s after having been shifted.

Figure 4:
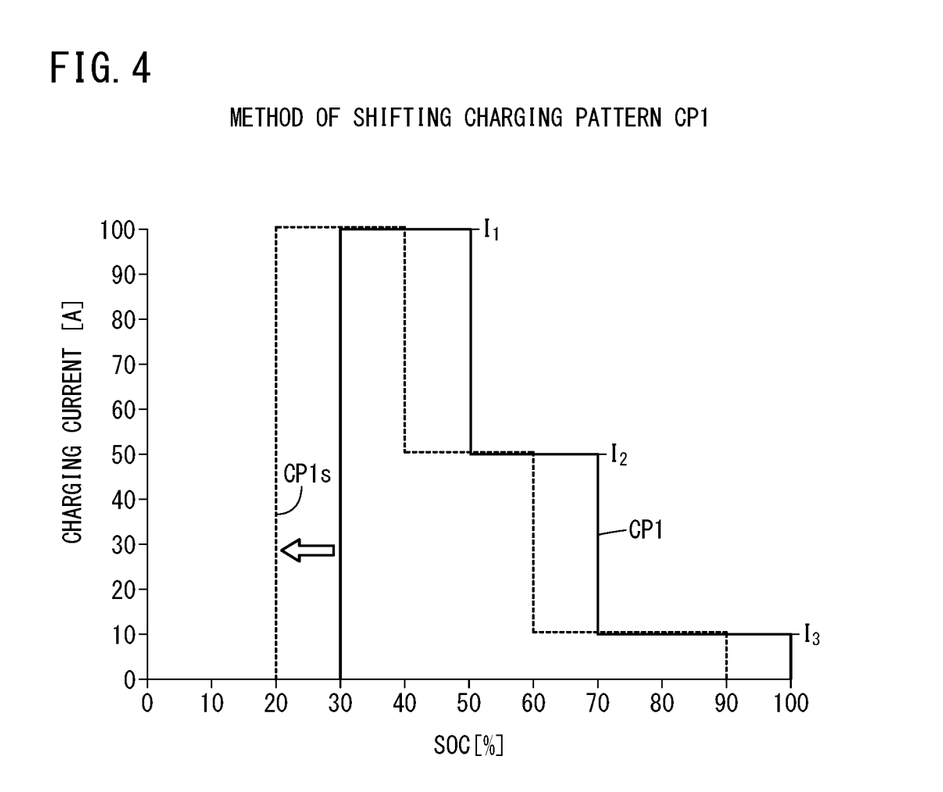
FIG. 4 is a diagram (1 of 2) showing an example of causing a shift in a charging pattern.

Thus, in the case that the SOC of the secondary battery 12 when charging is initiated is 0 to 30%, the charging control unit 20 uses the charging pattern CP1 whose reference state of charge is 30%. More specifically, the charging control unit 20 shifts the charging pattern CP1 to the side where the SOC becomes lower (see FIG. 4), so that the reference state of charge of the charging pattern CP1 (the SOC when charging is initiated, which is set in the charging pattern CP1) coincides with the SOC (for example, 20%) of the secondary battery 12 when charging is initiated, and controls the charging current in accordance with the charging pattern CP1s after having been shifted. Moreover, in FIG. 4, a case is shown as an example when $I_1$=100 A, $I_2$=50 A, and $I_3$=10 A. In FIG. 4, the charging pattern CP1 is indicated by the solid line, and the charging pattern CP1s, which is obtained by shifting the charging pattern CP1 by an amount of 10% of the SOC, is indicated by the dashed line. In this case as well, it is possible to perform charging without the occurrence of Li electrolytic deposition.

Figure 5:
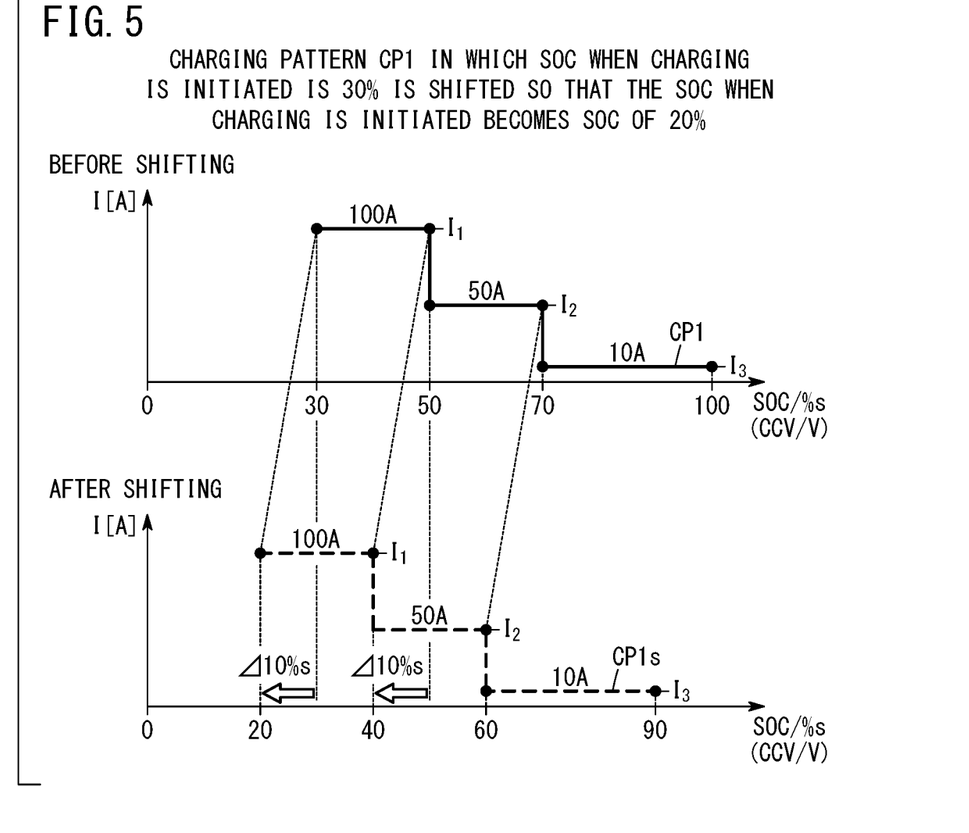
FIG. 5 is a diagram (2 of 2) showing an example of causing a shift in a charging pattern.

In FIG. 5, an image view is shown for facilitating understanding of the shifting of the charging pattern CP1 shown in FIG. 4. As can be understood from FIG. 5, the charging pattern CP1s after having been shifted, which is obtained by shifting the charging pattern CP1 by an amount of 10% of the SOC, has a SOC when charging is initiated of 20%, the charging current becomes $I_1$=100 A when the SOC is 20 to 40%, the charging current becomes $I_2$=50 A when the SOC is 40 to 60%, and the charging current becomes $I_3$=10 A when the SOC is 60 to 100%.

Moreover, in the foregoing manner, in the case that the charging pattern CP1 is shifted to the side where the SOC becomes lower, in the charging pattern CP1s after having been shifted, there is no portion therein corresponding to a SOC of X ($>70$) to 100%. Thus, after completion of charging by the charging pattern CP1s (when the SOC is X to 100%), the charging control unit 20 may perform charging with a predetermined constant charging current $I_4$ ($\leq I_3$), or may end charging at the SOC at which charging is completed in the charging pattern CP1s.

The charging pattern CP2 is defined by a charging pattern CP in which the SOC when charging is initiated is 50%, the charging current becomes a constant current $I_5$ when the SOC lies within a range of 50 to 70%, and the charging current becomes a constant current $I_6$ ($I_6<I_5$) when the SOC is 70 to 100%. The value of $I_5$ is a maximum value at which Li electrolytic deposition does not occur, or a value that is slightly lower than such a maximum value, when the SOC lies within the range of 50 to 70%. The value of $I_6$ is a maximum value at which Li electrolytic deposition does not occur, or a value that is slightly lower than such a maximum value, when the SOC lies within the range of 70 to 100%.

In this manner, the charging pattern CP2 is a charging pattern CP corresponding to a SOC of 50 to 100%, in which the state of charge when charging is initiated is set to 50%. More specifically, the charging pattern CP2 is an ideal (optimum) charging pattern CP when the SOC of the secondary battery 12 at the time that charging is initiated is 50%.

In this instance, because the charging pattern CP2 is a charging pattern CP in which Li electrolytic deposition does not occur when the SOC of the secondary battery 12 at the time that charging is initiated is 50%, Li electrolytic deposition is not generated, even if the charging control unit 20 causes the charging pattern CP2 to be shifted to a side where the SOC becomes lower, and controls the charging current in accordance with the charging pattern CP2s after having been shifted.

Thus, in the case that the SOC of the secondary battery 12 when charging is initiated is 30 to 50%, the charging control unit 20 uses the charging pattern CP2 whose reference state of charge is 50%. More specifically, the charging control unit 20 shifts the charging pattern CP2 to the side where the SOC becomes lower, so that the reference state of charge of the charging pattern CP2 (the SOC when charging is initiated, which is set in the charging pattern CP2) coincides with the SOC of the secondary battery 12 when charging is initiated, and controls the charging current in accordance with the charging pattern CP2s after having been shifted. In this case as well, it is possible to perform charging without the occurrence of Li electrolytic deposition.

Moreover, in the foregoing manner, in the case that the charging pattern CP2 is shifted to the side where the SOC becomes lower, in the charging pattern CP2s after having been shifted, there is no portion therein corresponding to a SOC of Y ($>50$) to 100%. Thus, after completion of charging by the charging pattern CP2s (when the SOC is Y to 100%), the charging control unit 20 may perform charging with a predetermined constant charging current $I_7$ ($\leq I_6$), or may end charging at the SOC at which charging is completed in the charging pattern CP2s.

The charging pattern CP3 is defined by a charging pattern CP in which the SOC when charging is initiated is 70%, the charging current becomes a constant current $I_8$ when the SOC lies within a range of 70 to 85%, and the charging current becomes a constant current $I_9$ ($I_9 \leq I_8$) when the SOC is 85 to 100%. The value of $I_8$ is a maximum value at which Li electrolytic deposition does not occur, or a value that is slightly lower than such a maximum value, when the SOC lies within the range of 70 to 85%. The value of $I_9$ is a maximum value at which Li electrolytic deposition does not occur, or a value that is slightly lower than such a maximum value, when the SOC lies within the range of 85 to 100%.

In this manner, the charging pattern CP3 is a charging pattern CP corresponding to a SOC of 70 to 100%, in which the state of charge when charging is initiated is set to 70%. More specifically, the charging pattern CP3 is an ideal (optimum) charging pattern CP when the SOC of the secondary battery 12 at the time that charging is initiated is 70%.

In this instance, because the charging pattern CP3 is a charging pattern CP in which Li electrolytic deposition does not occur when the SOC of the secondary battery 12 at the time that charging is initiated is 70%, Li electrolytic deposition is not generated, even if the charging control unit 20 causes the charging pattern CP3 to be shifted to a side where the SOC becomes lower, and controls the charging current in accordance with the charging pattern CP3s after having been shifted.

Thus, in the case that the SOC of the secondary battery 12 when charging is initiated is 50 to 70%, the charging control unit 20 uses the charging pattern CP3 whose reference state of charge is 70%. More specifically, the charging control unit 20 shifts the charging pattern CP3 to the side where the SOC becomes lower, so that the reference state of charge of the charging pattern CP3 (the SOC when charging is initiated, which is set in the charging pattern CP3) coincides with the SOC of the secondary battery 12 when charging is initiated, and controls the charging current in accordance with the charging pattern CP3s after having been shifted. In this case as well, it is possible to perform charging without the occurrence of Li electrolytic deposition.

Moreover, in the foregoing manner, in the case that the charging pattern CP3 is shifted to the side where the SOC becomes lower, in the charging pattern CP3s after having been shifted, there is no portion therein corresponding to a SOC of Z (>30) to 100%. Thus, after completion of charging by the charging pattern CP3s (when the SOC is Z to 100%), the charging control unit 20 may perform charging with a predetermined constant charging current $I_{10}$ ($\leq I_9$), or may end charging at the SOC at which charging is completed in the charging pattern CP3s.

In the foregoing manner, according to the present embodiment, by the charging control unit 20 making use of the charging patterns CP1 to CP3, when the SOC at the time that charging is initiated is 0 to 70%, the secondary battery 12 can be charged with a relatively large charging current, while enabling the occurrence of Li electrolytic deposition to be suppressed with respect to a desired SOC range. Moreover, in the case that the SOC of the secondary battery 12 when charging is initiated lies within a range of being higher than 70% and less than or equal to 100%, the charging control unit 20 may utilize the charging pattern C3 whose reference state of charge is nearest to the range (the charging pattern CP whose reference state of charge is 70%) as it is (without being shifted). Further, in the SOC range (70 to 100%), the charging control unit 20 may control the charging current with a predetermined constant current.

It should be noted that it is not strictly necessary to prepare all of the charging patterns CP1 to CP3, and in essence, at least one charging pattern CP may be prepared. For example, in the case that the SOC of the secondary battery 12 when charging is initiated is limited to a low SOC range (for example, 0 to 30%), as necessary, the charging control unit 20 may shift and utilize only the charging pattern CP1. Further, in the case that the SOC of the secondary battery 12 when charging is initiated is limited to a high SOC range (for example, 50 to 70%), as necessary, the charging control unit 20 may shift and utilize only the charging pattern CP3. Further, in the case that the SOC of the secondary battery 12 when charging is initiated is limited to a medium SOC range (for example, 30 to 50%), as necessary, the charging control unit 20 may shift and utilize only the charging pattern CP2. Further, in the case that the SOC of the secondary battery 12 when charging is initiated is limited to the low SOC range and the medium SOC range, as necessary, the charging control unit 20 may shift and utilize the charging patterns CP1 and CP2, respectively. Further, in the case that the SOC of the secondary battery 12 when charging is initiated is limited to the medium SOC range and the high SOC range, as necessary, the charging control unit 20 may shift and utilize the charging patterns CP2 and CP3, respectively.

Further, when the charging control unit 20 shifts the charging pattern CP in a direction in which the SOC becomes decreased, the reference state of charge (the SOC when charging is initiated) of the charging pattern CP need not necessarily be made to coincide with the actual SOC of the secondary battery 12 when charging is initiated, and for example, may be made to coincide with a SOC that is lower than the actual SOC of the secondary battery 12 when charging is initiated.

Although a detailed description has been given above concerning a case of performing rapid charging by the secondary battery charging system 10, in the case of normal charging in which charging is performed using a low voltage and a low current, in general, it is not necessary for Li electrolytic deposition to be considered, and therefore, the charging control unit 20 need not necessarily utilize the above-described charging pattern CP in which the charging current decreases in a stepwise manner as the SOC becomes higher. Thus, the charging control unit 20 charges the secondary battery 12 with a constant charging current which is less than or equal to a predetermined value (a value smaller than all of the charging currents $I_1$ to $I_{10}$) in the normal charging mode. At this time, the charging control unit 20 may change the constant current in accordance with the SOC of the secondary battery 12 when charging is initiated. Moreover, even in the case of normal charging, for example, in the event there is a need to consider Li electrolytic deposition, the above-described charging pattern CP may be used in which the charging current decreases in a stepwise manner as the SOC becomes higher.

Figure 6:
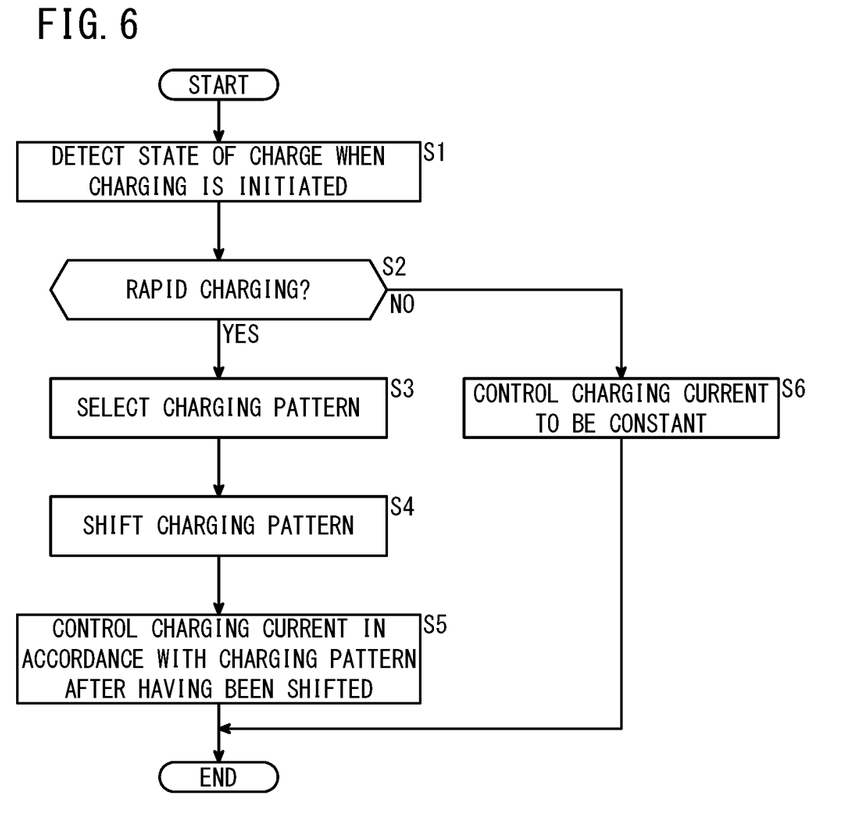
FIG. 6 is a flowchart showing a process flow of a charging control implemented by the charging control device.

Hereinafter, a description will be given with reference to FIG. 6 concerning a specific example of a charging control performed by the charging control device 14 when charging with respect to the secondary battery 12 is carried out. The flowchart of FIG. 6 is based on a processing algorithm executed by the charging control unit 20.

Charging of the secondary battery 12 is initiated when the charging control unit 20 is connected to the first power supply unit 16 or the second power supply unit 17. A manual switch may be provided, and charging of the secondary battery 12 may be switched between ON and OFF by a user turning the switch ON or OFF. Further, data of the aforementioned charging patterns CP1, CP2, and CP3 are stored in the storage unit 22.

In the first step S1, the state of charge detection unit 18 detects the state of charge of the secondary battery 12 when charging is initiated. More specifically, the state of charge detection unit 18 detects the state of charge of the secondary battery 12 when the charging control unit 20 is connected to the first power supply unit 16 or the second power supply unit 17, and sends the detection result thereof to the charging control unit 20.

In the following step S2, the charging control unit 20 determines whether or not the charging mode is the rapid charging mode. If the determination in this instance is affirmed (in the case of the rapid charging mode, and more specifically, in the case that the charging control unit 20 is connected to the first power supply unit 16), the process proceeds to step S3, whereas if the determination is negative (in the case of the normal charging mode, and more specifically, in the case that the charging control unit 20 is connected to the second power supply unit 17), the process proceeds to step S6.

In step S3, depending on the detection result of the state of charge detection unit 18 when the charging control unit 20 is connected to the first power supply unit 16 (i.e., the SOC of the secondary battery 12 when charging is initiated), data of one charging pattern CP is selected from among the data of the three charging patterns CP1, CP2, and CP3 that are stored in the storage unit 22. More specifically, when the SOC of the secondary battery 12 when charging is initiated is greater than or equal to 0% and less than or equal to 30%, the charging control unit 20 selects the data of the charging pattern CP1. When the SOC of the secondary battery 12 when charging is initiated is greater than 30% and less than or equal to 50%, the charging control unit 20 selects the data of the charging pattern CP2. When the SOC of the secondary battery 12 when charging is initiated is greater than 50% and less than or equal to 70%, the charging control unit 20 selects the data of the charging pattern CP3.

In the following step S4, depending on the detection result of the state of charge detection unit 18 when the charging control unit 20 is connected to the first power supply unit 16 (i.e., the SOC of the secondary battery 12 when charging is initiated), the selected charging pattern CP is shifted to the side where the SOC becomes lower, and the reference state of charge of the charging pattern CP is made to coincide with the SOC of the secondary battery 12 when charging is initiated. More specifically, the charging control unit 20 shifts the data of the selected charging pattern CP in a direction in which the SOC decreases by an amount equivalent to the difference between the reference state of charge of the charging pattern CP and the SOC of the secondary battery 12 when charging is initiated. Therefore, if the SOC of the secondary battery 12 when charging is initiated coincides with the reference state of charge of the selected charging pattern CP, the aforementioned shifting is not carried out.

In the following step S5, the charging control unit 20 controls the charging current in accordance with the charging pattern CPs after having been shifted. More specifically, the charging control unit 20 adjusts the current supplied from the first power supply unit 16 in accordance with the data of the charging pattern CPs after having been shifted, and supplies the adjusted current as a charging current to the secondary battery 12 (see FIG. 3). After execution of step S5, the process flow is brought to an end. Moreover, since the charging pattern CPs after having been shifted has a SOC at the time that charging is completed of less than 100%, the charging control unit 20 may terminate charging with the SOC when charging is completed (the SOC of less than 100%), or as described above, charging may be performed with a predetermined constant charging current until the SOC becomes 100%.

In step S6, the charging control unit 20 controls the charging current at a constant current that is less than or equal to a predetermined value. More specifically, depending on the state of charge of the secondary battery 12 when charging is initiated, the charging control unit 20 changes the magnitude of the predetermined constant charging current (a constant current that is less than or equal to the aforementioned predetermined value), and the current supplied from the second power supply unit 17 is adjusted to the constant charging current after the change, and is supplied to the secondary battery 12. At this time, the charging control unit 20 sets the charging current to be smaller as the state of charge of the secondary battery 12 when charging is initiated is lower. After execution of step S6, the process flow is brought to an end.

[Modifications]

Incidentally, it is known that, in a lithium ion battery, as the temperature of the lithium ion battery becomes lower, it is easier for Li electrolytic deposition to occur.

Thus, the SOC (the reference state of charge) when charging is initiated may be the same, and a plurality of charging patterns CPt which correspond individually with a plurality of temperatures (a plurality of charging patterns CPt in which the charging currents thereof become smaller as the charging patterns CPt correspond to lower temperatures) may be prepared. At this time, from among the plurality of charging patterns CPt, the charging control unit 20 preferably selects a charging pattern CPt in accordance with the temperature of the secondary battery 12, and as necessary, shifts the selected charging pattern CPt in a direction in which the SOC becomes lower, and preferably controls the charging current with the charging pattern CPt after having been shifted.

Figure 8:
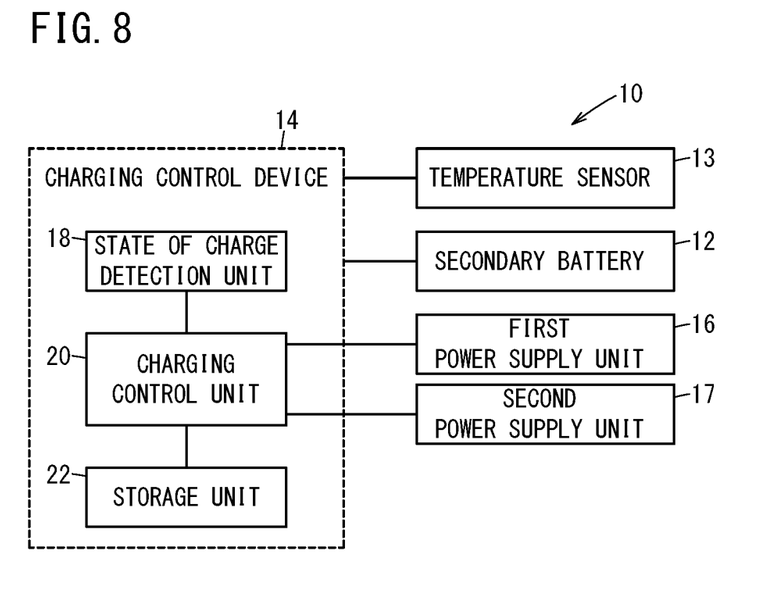
FIG. 8 is a block diagram showing the functions of a secondary battery charging system equipped with a charging control device according to a modification of the embodiment of the present invention.

In order to realize such a control, a plurality of charging patterns CPt preferably are stored in the storage unit 22, and a temperature sensor 13 (a contact type or non-contact type of sensor may be used) is preferably provided for detecting the temperature of the secondary battery 12. FIG. 8 is a block diagram showing the functions of a secondary battery charging system equipped with a charging control device according to such a modification of the embodiment of the present invention. As shown in FIG. 8, in the charging control device 14 according to the present modification, the temperature sensor 13 is provided that detects the temperature of the secondary battery 12.

Further, by preparing sets of a plurality of charging patterns CPt for which the SOC when charging is initiated (the reference state of charge) is the same, as a plurality of sets (a plurality of sets with different SOCs at the start of charging) for each of respective SOCs when charging is initiated, the charging control unit 20 is capable of selecting and utilizing an optimum charging pattern CPt in accordance with the SOC and the temperature of the secondary battery 12 when charging is initiated.

In order to realize such a control, the sets of the plurality of charging patterns CPt preferably are stored as a plurality of sets in the storage unit 22, and a temperature sensor 13 (a contact type or non-contact type of sensor may be used) is preferably provided for detecting the temperature of the secondary battery 12. In addition, the charging control unit 20 may select one set from among the aforementioned plurality of sets in accordance with the SOC of the secondary battery 12 when charging is initiated, and from among the plurality of charging patterns of that one set, may select a charging pattern CPt in accordance with the detection result of the above-described temperature sensor 13. Furthermore, as necessary, the charging control unit 20 may shift the selected charging pattern CPt in a direction in which the SOC becomes lower, and the charging current may be controlled with the charging pattern CPt after having been shifted.

Although a description has been given above as an example concerning a charging pattern CP in which the charging current decreases in a stepwise manner as the SOC becomes higher, the charging control unit 20 may utilize a charging pattern CP in which the charging current remains constant regardless of the SOC.

Figure 7:
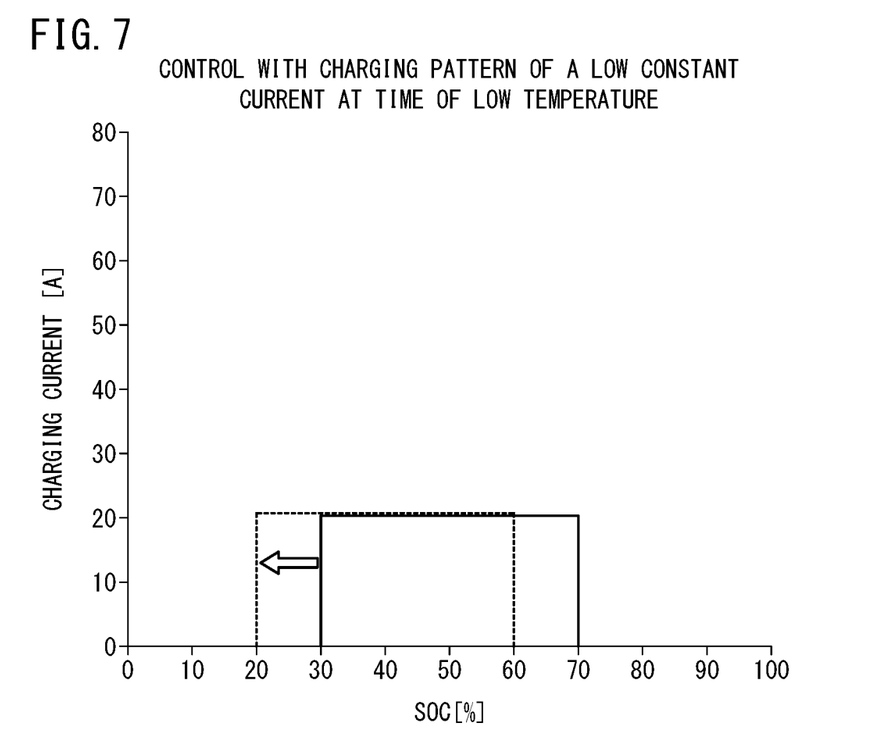
FIG. 7 is a diagram showing an example of charging a secondary battery at a low temperature using a constant current charging pattern.

For example, when the secondary battery 12 is at a relatively low temperature, Li electrolytic deposition is highly likely to occur, and therefore, charging may be carried out with a constant current that is as low as possible. As an example thereof, in FIG. 7, there is shown a charging pattern CP (the solid line in FIG. 7) of a constant current (e.g., 20 A) having a reference state of charge of 30% and a SOC when charging is completed of 70%. The charging control unit 20 may cause the constant current charging pattern to be shifted to the side where the SOC becomes lower, in accordance with the SOC when charging is initiated. The dashed line shown in FIG. 7 indicates a charging pattern CPs obtained by shifting the constant current charging pattern CP by an amount of 10% of the SOC. The charging pattern CPs after having been shifted is a charging pattern of a constant current (e.g., 20 A) having a SOC when charging is initiated of 20% and a SOC when charging is completed of 60%. In this case, the charging control unit 20 is capable of charging the secondary battery 12 by a predetermined SOC amount (in this instance, a SOC of 40%) while suppressing the occurrence of Li electrolytic deposition both before and after shifting of the charging pattern.

Moreover, the charging patterns that are used for the charging control are not limited to the charging patterns described in the aforementioned embodiment, but in essence, the charging control unit 20 may utilize at least one charging pattern depending on the SOC and the temperature of the secondary battery 12 when charging is initiated. For example, the charging control unit 20 can also utilize four or more charging patterns in accordance with the SOC and the temperature when charging is initiated. Further, in the charging pattern in which the charging current decreases in a stepwise manner, the number of times (number of stages) that the charging current decreases, the difference in level (the width over which the charging current is reduced), and the width of each stage (the SOC ranges in which the charging current remains constant) also are not limited to the descriptions given above, but can be changed as appropriate.

Further, in the above-described embodiment, although the charging control unit 20 utilizes a charging pattern CP in which the charging current decreases in a stepwise manner, instead of this feature, for example, a charging pattern may be used in which the charging current gradually decreases. For example, the charging control unit 20 may utilize a charging pattern that is inclined in a manner so that the charging current becomes smaller as it approaches the fully charged state. Further, for example, the charging control unit 20 may also utilize a polygonal line shaped charging pattern in which the angle of inclination is changed in stages (the angle of inclination increases or decreases monotonically) in a manner so that the charging current decreases as it approaches the fully charged state.

Further, in the above-described embodiment, a description has been given in which the charging control unit 20 causes the charging pattern to be shifted in the direction in which the SOC becomes lower, however, the charging control unit 20 may cause the charging pattern to be shifted in a direction in which the SOC becomes higher. More specifically, for example, the charging control unit 20 may cause a charging pattern $CP_0$ in which the SOC when charging is initiated is set to 0% to be shifted in a direction in which the SOC becomes higher, when the SOC of the secondary battery 12 when charging is initiated is in a low SOC range (for example, the SOC ranges from 0 to 30%). For example, the charging control unit 20 may cause a charging pattern $CP_{30}$ in which the SOC when charging is initiated is set to 30% to be shifted in a direction in which the SOC becomes higher, when the SOC of the secondary battery 12 when charging is initiated is in a medium SOC range (for example, the SOC ranges from 30 to 50%). For example, the charging control unit 20 may cause a charging pattern $CP_{70}$ in which the SOC when charging is initiated is set to 70% to be shifted in a direction in which the SOC becomes higher, when the SOC of the secondary battery 12 when charging is initiated is in a high SOC range (for example, the SOC ranges from 70 to 100%). In this manner, in the case that the charging pattern is shifted in the direction in which the SOC becomes higher, the charging control unit 20 may cause the charging pattern to be shifted in a manner so that the reference state of charge becomes less than the SOC of the secondary battery 12 when charging is initiated, or may cause the charging pattern to be shifted in a manner so that the reference state of charge coincides with the SOC of the secondary battery 12 when charging is initiated. Moreover, in this case, the maximum amount of shifting of the charging pattern preferably is set to a value at which Li electrolytic deposition does not occur. Further, in this case as well, when a plurality of charging patterns are used in which the reference states of charge thereof differ from each other, the charging control unit 20 preferably utilizes a charging pattern in which a first state of charge is closest to the state of charge when charging is initiated. Further, the charging control unit 20 may cause the charging pattern in which the charging current is constant to be shifted in a direction in which the SOC becomes higher.

Moreover, according to the above-described embodiment, although the charging control device 14 is used for charging a lithium ion battery as the secondary battery 12, assuming they are secondary batteries in which electrolytic deposition can occur, the charging control device 14 is also effective for charging other types of secondary batteries.

Summary of Embodiment and Modifications

The above-described embodiment and the modifications thereof may be summarized as follows.

The charging control device 14 is adapted to control a charging current supplied to the secondary battery 12, the charging control device 14 comprising the state of charge detection unit 18 that detects the state of charge of the secondary battery 12, the storage unit 22 in which there is stored the charging pattern CP in which the state of charge of the secondary battery 12 and the charging current are associated, and the charging control unit 20 that changes the charging pattern in accordance with the state of charge of the secondary battery 12 when charging is initiated, and controls the charging current in accordance with the charging pattern CPs after having been changed.

In this case, the charging control unit 20 is capable of controlling the charging current with an appropriate charging pattern CP in accordance with the state of charge of the secondary battery 12 when charging is initiated, and therefore, regardless of the state of charge of the secondary battery when charging is initiated, it is possible to suppress an increase in the charging time, and to suppress the occurrence of Li electrolytic deposition.

Further, the charging pattern CP is a charging pattern which is determined by the state of charge of the secondary battery 12 when charging is initiated. Moreover, the state of charge (the reference state of charge) when charging is initiated in the charging pattern CP preferably is set to a value (for example, 0%, 10%, 20%, 30%, 40%, 50%, 60%, 70%, etc.) at which a frequency of the SOC of the secondary battery 12 when charging is initiated becomes greater. This is because the charging pattern CP is a pattern in which the state of charge and the charging current are associated in a well-balanced manner in accordance with the reference state of charge.

Further, in the charging control unit 20, in the case that the state of charge of the secondary battery 12 when charging is initiated is lower than the reference state of charge, the charging pattern CP is changed by being shifted in a direction in which the state of charge becomes lower. More specifically, in the case that the state of charge of the secondary battery 12 when charging is initiated is lower than the reference state of charge, the charging control unit 20 changes the charging pattern CP in a manner so that the state of charge corresponding to the charging current of the charging pattern CP is lowered. In this case, even if the state of charge of the secondary battery 12 when charging is initiated is lower than the reference state of charge, by a simple control of merely shifting the charging pattern CP in a direction in which the state of charge becomes lower, it is possible to control the charging current in a manner so that the occurrence of Li electrolytic deposition is suppressed. In this manner, since the charging control unit 20 is capable of carrying out charging by shifting the charging pattern CP, even in the case that the state of charge when charging is initiated is lower than the reference state of charge, within the range of shifting thereof, there is no need to prepare charging patterns CP corresponding to each of the SOCs.

Further, in the charging control unit 20, in the case that the state of charge of the secondary battery 12 when charging is initiated is lower than the reference state of charge, the charging pattern CP may be shifted in a direction in which the state of charge is lowered, in a manner so that the reference state of charge becomes the state of charge of the secondary battery 12 when charging is initiated. More specifically, in the charging control unit 20, in the case that the state of charge of the secondary battery 12 when charging is initiated is lower than the reference state of charge, the charging pattern CP may be changed in a manner so that the state of charge corresponding to the charging current of the charging pattern CP is lowered by an amount equal to the difference between the state of charge of the secondary battery 12 when charging is initiated and the state of charge of the charging pattern CP when charging is initiated.

Further, in the charging pattern CP, the state of charge of the charging pattern CP when charging is initiated is set to a 1st state of charge (the reference state of charge), and a 1st charging current is associated from the 1st state of charge until reaching a 2nd state of charge that is closer to full charge than the 1st state of charge. For example, as shown in FIG. 3, the charging pattern CP1 is associated with the charging current $I_1$ (the 1st charging current) from the SOC of 30% (the 1st state of charge) to the SOC of 50% (the 2nd state of charge). The charging pattern CP2 is associated with the charging current $I_5$ (the 1st charging current) from the SOC of 50% (the 1st state of charge) to the SOC of 70% (the 2nd state of charge). The charging pattern CP3 is associated with the charging current $I_8$ (the 1st charging current) from the SOC of 70% (the 1st state of charge) to the SOC of 85% (the 2nd state of charge).

Further, in the charging pattern CP, letting n be an integer of 2 or greater, an (n−1)th charging current is associated from an (n−1)th state of charge until reaching an nth state of charge that is closer to full charge than the (n−1)th state of charge, and an nth charging current which is smaller than the (n−1)th charging current is associated from the nth state of charge until reaching an (n+1)th state of charge that is closer to full charge than the nth state of charge. For example, as shown in FIG. 3, the charging pattern CP1 is associated with the charging current $I_1$ (the (n−1)th charging current) from the SOC of 30% (the (n−1)th state of charge) to the SOC of 50% (the nth state of charge). Furthermore, the charging pattern CP1 is associated with the charging current $I_2$ (the nth charging current) from the SOC of 50% (the nth state of charge) to the SOC of 70% (the (n+1)th state of charge).

Further, in the charging control unit 20, in the case that the state of charge of the secondary battery 12 when charging is initiated is a 1'st state of charge which is lower than the 1st state of charge, the charging pattern CP is changed so as to become the 1st charging current until reaching a 2'nd state of charge at which a difference, from the 1'st state of charge, between the 1'st state of charge and the 2'nd state of charge that is closer to full charge than the 1'st state of charge becomes equivalent to a difference between the 1st state of charge and the 2nd state of charge. For example, in the charging control unit 20, in the case that the state of charge of the secondary battery 12 when charging is initiated is the SOC of 20% (the 1'st state of charge) which is lower than the SOC of 30% (the 1st state of charge), the charging pattern CP1 is shifted so as to become $I_1$=100 A (the 1st charging current) until reaching the SOC of 40% (the 2'nd state of charge) which is higher than the SOC of 20% (the 1'st state of charge) by the difference (20%), from the SOC of 20% (the 1'st state of charge), between the SOC of 30% (the 1st state of charge) and the SOC of 50% (the 2nd state of charge).

Further, in the charging control unit 20, letting n be an integer of 2 or greater, an (n'−1)th state of charge is a state of charge that is lower than the (n−1)th state of charge, and the charging pattern CP is changed so as to become the (n−1)th charging current, until reaching an n'th state of charge at which a difference, from the (n'−1)th state of charge, between the (n'−1)th state of charge and an n'th state of charge that is closer to full charge than the (n'−1)th state of charge becomes equivalent to a difference between the (n−1)th state of charge and the nth state of charge, and so as to become the nth charging current, until reaching an (n'+1)th state of charge at which a difference, from the n'th state of charge, between the n'th state of charge and an (n'+1)th state of charge that is closer to full charge than the n'th state of charge becomes equivalent to a difference between the nth state of charge and the (n+1)th state of charge. For example, as shown in FIG. 4, the charging control unit 20 carries out a change by causing the charging pattern CP1 to be shifted, so as to become the charging current $I_1$=100 A (the (n−1)th charging current) from the SOC of 20% (the (n'−1)th state of charge) which is lower than the SOC of 30% (the (n−1)th state of charge) until reaching the SOC of 40% (the n'th state of charge) which is higher than the SOC of 20% (the (n'−1)th state of charge) by the difference (20%) between the SOC of 30% (the (n−1)th state of charge) and the SOC of 50% (the nth state of charge), and to become the charging current $I_2$=50 A (the nth charging current) from the SOC of 40% (the n'th state of charge) until reaching the SOC of 60% (the (n'+1)th state of charge) which is higher than the SOC of 40% (the n'th state of charge) by the difference (20%) between the SOC of 50% (the nth state of charge) and the SOC of 70% (the (n+1)th state of charge).

Further, the storage unit 22 preferably stores a plurality of the charging patterns CP, and in the plurality of charging patterns CP, the states of charge when charging is initiated differ from each other. Additionally, in the charging control unit 20, a charging pattern CP preferably is utilized in which the state of charge of the charging pattern CP when charging is initiated is higher than the state of charge of the secondary battery 12 when charging is initiated, and is closest to the state of charge of the secondary battery 12 when charging is initiated, and the charging pattern CP that is used preferably is changed (shifted) in accordance with the state of charge of the secondary battery 12 when charging is initiated. In this case, Li electrolytic deposition can be suppressed while the charging current is kept relatively high.

Further, the charging control device 14 may further be equipped with the temperature sensor 13 (temperature detecting unit) that detects the temperature of the secondary battery 12, in which case, the storage unit 22 may store a plurality of charging patterns in accordance with temperatures of the secondary battery 12, and in the charging control unit 20, a charging pattern in accordance with the temperature of the secondary battery 12 may be utilized, and the utilized charging pattern may be changed in accordance with the state of charge when charging is initiated.

Further, in the plurality of charging patterns in accordance with temperatures of the secondary battery 12, the charging current preferably becomes smaller as the temperature is lower.

Further, in the charging control unit 20, in the case that the secondary battery 12 is charged with the charging current which is less than or equal to a predetermined value (a value smaller than all of the charging currents $I_1$ to $I_{10}$) (i.e., in the case of normal charging), the charging current may be controlled to be a constant current that is less than or equal to the predetermined value, without using the charging pattern that decreases as it approaches full charge. Further, in the charging control unit 20, a magnitude of the aforementioned constant current may be changed in accordance with the state of charge of the secondary battery 12 when charging is initiated, and more specifically, the charging current may be changed by shifting a prescribed charging pattern in a direction of increasing or in a direction of decreasing the charging current.

Although certain preferred embodiments of the present invention have been shown and described in detail, it should be understood that various changes and modifications may be made therein without departing from the scope of the appended claims.

What is claimed is:

1. A charging control device adapted to control a charging current supplied to a secondary battery, comprising:
   a state of charge detection unit adapted to detect a state of charge of the secondary battery;
   a storage unit adapted to store a charging pattern in which the state of charge and the charging current are associated in a manner where the charging current decreases as the state of charge approaches full charge; and
   a charging control unit adapted to change the charging pattern in accordance with the state of charge of the secondary battery when charging is initiated, and to control the charging current in accordance with the charging pattern after having been changed, wherein the charging pattern is a charging pattern determined by the state of charge when charging is initiated, and
   in the charging control unit, in the case that the state of charge when charging is initiated is lower than the state of charge of the charging pattern when charging is initiated, the charging pattern is changed in a manner that the state of charge corresponding to the charging current of the charging pattern is lowered by an amount equal to a difference between the state of charge when charging is initiated and the state of charge of the charging pattern when charging is initiated.

2. The charging control device according to claim 1, wherein, in the charging control unit, in the case that the state of charge when charging is initiated is lower than the state of charge of the charging pattern when charging is initiated, the charging pattern is changed in a manner where the state of charge corresponding to the charging current of the charging pattern is lowered.

3. The charging control device according to claim 1, further comprising:
   a temperature detecting unit adapted to detect a temperature of the secondary battery;
   wherein the storage unit stores a plurality of charging patterns in accordance with temperatures of the secondary battery; and
   in the charging control unit, the charging pattern in accordance with the temperature of the secondary battery is utilized, and the utilized charging pattern is changed in accordance with the state of charge when charging is initiated.

4. The charging control device according to claim 3, wherein, in the plurality of charging patterns in accordance with temperatures of the secondary battery, the charging current becomes smaller as the temperature is lower.

5. The charging control device according to claim 1, wherein, in the charging control unit, in the case that the secondary battery is charged with the charging current which is less than or equal to a predetermined value, the charging current is controlled to be a constant current that is less than or equal to the predetermined value without using the charging pattern.

6. The charging control device according to claim 5, wherein, in the charging control unit, a magnitude of the constant current is changed in accordance with the state of charge of the secondary battery when charging is initiated.

7. A charging control device adapted to control a charging current supplied to a secondary battery, comprising:
   a state of charge detection unit adapted to detect a state of charge of the secondary battery;
   a storage unit adapted to store a charging pattern in which the state of charge and the charging current are associated in a manner where the charging current decreases as the state of charge approaches full charge; and
   a charging control unit adapted to change the charging pattern in accordance with the state of charge of the secondary battery when charging is initiated, and to control the charging current in accordance with the charging pattern after having been changed wherein, in the charging pattern:
   the state of charge of the charging pattern when charging is initiated is set to a 1st state of charge; and
   a 1st charging current is associated from the 1st state of charge until reaching a 2nd state of charge that is closer to full charge than the 1st state of charge, and
   in the charging control unit, in the case that the state of charge when charging is initiated is a 1'st state of charge which is lower than the 1st state of charge, the charging pattern is changed to become the 1st charging current until reaching a 2'nd state of charge at which a difference, from the 1'st state of charge, between the 1'st state of charge and the 2'nd state of charge that is closer to full charge than the 1'st state of charge becomes equivalent to a difference between the 1st state of charge and the 2nd state of charge.

8. The charging control device according to claim 7, wherein, in the charging pattern:
   letting n be an integer of 2 or greater,
   an (n-1)th charging current is associated from an (n-1)th state of charge until reaching an nth state of charge that is closer to full charge than the (n-1)th state of charge; and
   an nth charging current which is smaller than the (n-1)th charging current is associated from the nth state of charge until reaching an (n+1)th state of charge that is closer to full charge than the nth state of charge.

9. The charging control device according to claim 7, wherein:
   in the charging control unit;
   letting n be an integer of 2 or greater;
   an (n'-1)th state of charge is a state of charge that is lower than an (n-1)th state of charge;
   the charging pattern is changed to become:
   an (n-1)th charging current, until reaching an n'th state of charge at which a difference, from the (n'-1)th state of charge, between the (n'-1)th state of charge and an n'th state of charge that is closer to full charge than the (n'-1)th state of charge becomes equivalent to a difference between the (n-1)th state of charge and the nth state of charge;
   and to become:
   the nth charging current, until reaching an (n'+1)th state of charge at which a difference, from the n'th state of charge, between the n'th state of charge and an (n'+1)th state of charge that is closer to full charge than the n'th state of charge becomes equivalent to a difference between the nth state of charge and the (n+1)th state of charge.

10. A charging control device adapted to control a charging current supplied to a secondary battery, comprising:
   a state of charge detection unit adapted to detect a state of charge of the secondary battery;
   a storage unit adapted to store a charging pattern in which the state of charge and the charging current are associated in a manner where the charging current decreases as the state of charge approaches full charge; and
   a charging control unit adapted to change the charging pattern in accordance with the state of charge of the secondary battery when charging is initiated, and to control the charging current in accordance with the charging pattern after having been changed wherein:
   the charging pattern is a charging pattern determined by the state of charge of the secondary battery when charging is initiated;
   the storage unit stores a plurality of charging patterns;
   in the plurality of charging patterns, the states of charge of the secondary battery when charging is initiated differ from each other; and
   in the charging control unit, a charging pattern selected from the plurality of charging patterns is utilized in which the state of charge of the charging pattern when charging is initiated is both higher than the state of charge of the secondary battery when charging is initiated and closest to the state of charge of the secondary battery when charging is initiated, and the utilized charging pattern is changed in accordance with the state of charge when charging is initiated.

* * * * *